United States Patent
Dave et al.

(10) Patent No.: US 9,633,355 B2
(45) Date of Patent: Apr. 25, 2017

(54) KNOWLEDGE BASED VERIFICATION OF THE IDENTITY OF A USER

(71) Applicant: Bank of America Corporation, Charlotte, NC (US)

(72) Inventors: Apeksh M. Dave, Weddington, NC (US); John F. Zemaitis, Charlotte, NC (US); Kenneth B. Norris, Midland, NC (US); Michael E. Toth, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 670 days.

(21) Appl. No.: 14/149,003

(22) Filed: Jan. 7, 2014

(65) Prior Publication Data

US 2015/0193781 A1 Jul. 9, 2015

(51) Int. Cl.
*G06Q 99/00* (2006.01)
*G06Q 30/00* (2012.01)
*H04L 29/06* (2006.01)

(52) U.S. Cl.
CPC ......... *G06Q 30/0185* (2013.01); *H04L 63/20* (2013.01); *H04L 63/0807* (2013.01)

(58) Field of Classification Search
CPC ................................................. G06Q 30/0185
USPC ....................................................... 705/318
See application file for complete search history.

(56) References Cited

U.S. PATENT DOCUMENTS

| | | | |
|---|---|---|---|
| 9,160,742 B1* | 10/2015 | Ackerman | .......... H04L 63/0853 |
| 2003/0154405 A1 | 8/2003 | Harrison | |
| 2008/0288299 A1 | 11/2008 | Schultz | |
| 2010/0043055 A1* | 2/2010 | Baumgart | .............. G06Q 20/12 726/2 |
| 2010/0122329 A1 | 5/2010 | Jakobsson et al. | |
| 2012/0023567 A1* | 1/2012 | Hammad | ............... G06Q 20/12 726/9 |
| 2012/0159647 A1 | 6/2012 | Sanin et al. | |
| 2012/0191621 A1 | 7/2012 | Williams et al. | |
| 2013/0036458 A1 | 2/2013 | Liberman et al. | |
| 2013/0036459 A1 | 2/2013 | Liberman et al. | |

FOREIGN PATENT DOCUMENTS

DE 10 2010 045 090 A1 3/2012

\* cited by examiner

*Primary Examiner* — Dennis Ruhl
(74) *Attorney, Agent, or Firm* — Michael A. Springs

(57) ABSTRACT

According to certain embodiments of the disclosure, a system receives a request from a user device to conduct an activity with an enterprise and determines an authentication level associated with the activity. The system receives information associated with the user from a plurality of disparate channels and calculates a risk score associated with the user based on the received information associated with the user. The system generates a token based on the authentication level and risk score and communicates the token to the user device.

21 Claims, 3 Drawing Sheets

KNOWLEDGE BASED VERIFICATION OF THE IDENTITY OF A USER

TECHNICAL FIELD

This invention relates generally to risk and fraud mitigation, and more particularly to knowledge based verification of the identity of a user.

BACKGROUND

Enterprises and financial institutions perform transactions on behalf of users and customers. Before embarking on a business transaction, such as transferring money from a customer's account, enterprises and financial institutions perform due diligence to verify the identity of a user. Currently, the information gathered to accomplish the due diligence is limited to a single channel.

SUMMARY OF EXAMPLE EMBODIMENTS

According to embodiments of the present disclosure, disadvantages and problems associated with knowledge based verification of the identity of a user may be reduced or eliminated.

In certain embodiments, a system receives a request from a user device to conduct an activity with an enterprise and determines an authentication level associated with the activity. The system receives information associated with the user from a plurality of disparate channels and calculates a risk score associated with the user based on the received information associated with the user. The system generates a token based on the authentication level and risk score and communicates the token to the user device.

Certain embodiments of the present disclosure may provide one or more technical advantages. A technical advantage of one embodiment includes receiving and aggregating information regarding user behavior from a plurality of disparate channels in order to mitigate the risk of fraud. Another technical advantage of an embodiment includes channel simplicity and creating a service that allows the enterprise to share data across multiple channels. Another technical advantage of an embodiment includes improved customer satisfaction through eliminating the need to request information from the customer multiple times across different channels. Yet another technical advantage of an embodiment includes creating centralized business rules for presenting identity verification and challenge questions.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

For a more complete understanding of the present invention and for further features and advantages thereof, reference is now made to the following description taken in conjunction with the accompanying drawings, in which.

DETAILED DESCRIPTION

Figure 1:
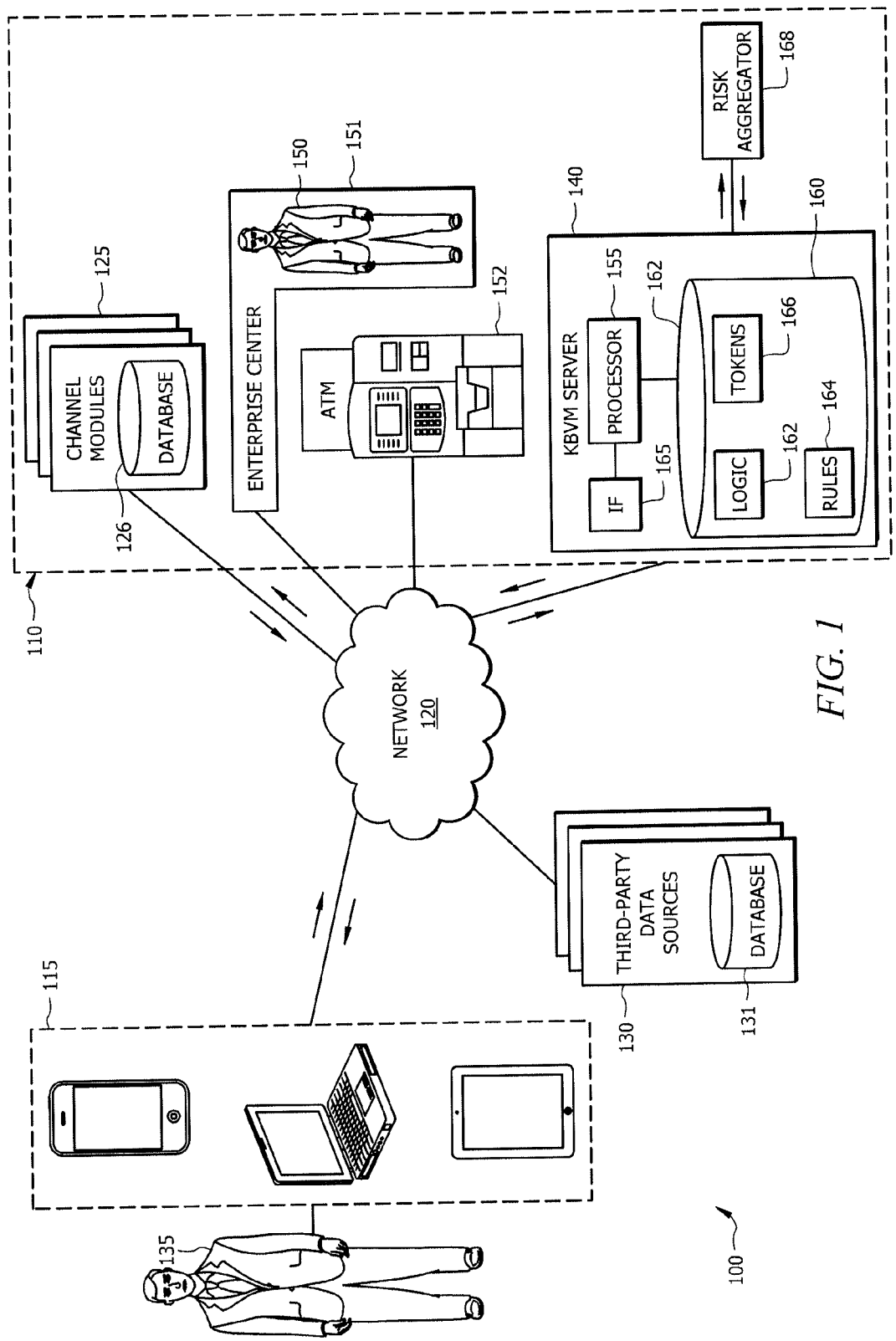
FIG. 1 illustrates an example of a system that facilitates verification of the identity of a user.
Figure 2:
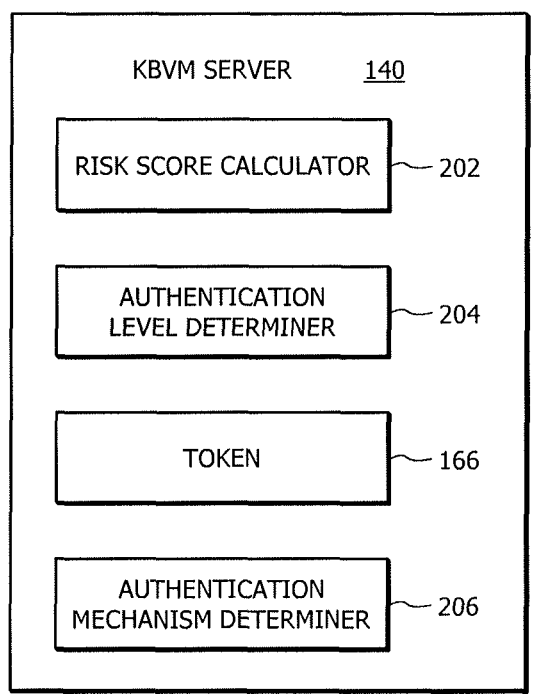
FIG. 2 illustrates an example of a knowledge based verification module server for facilitating verification of the identity of a user.
Figure 3:
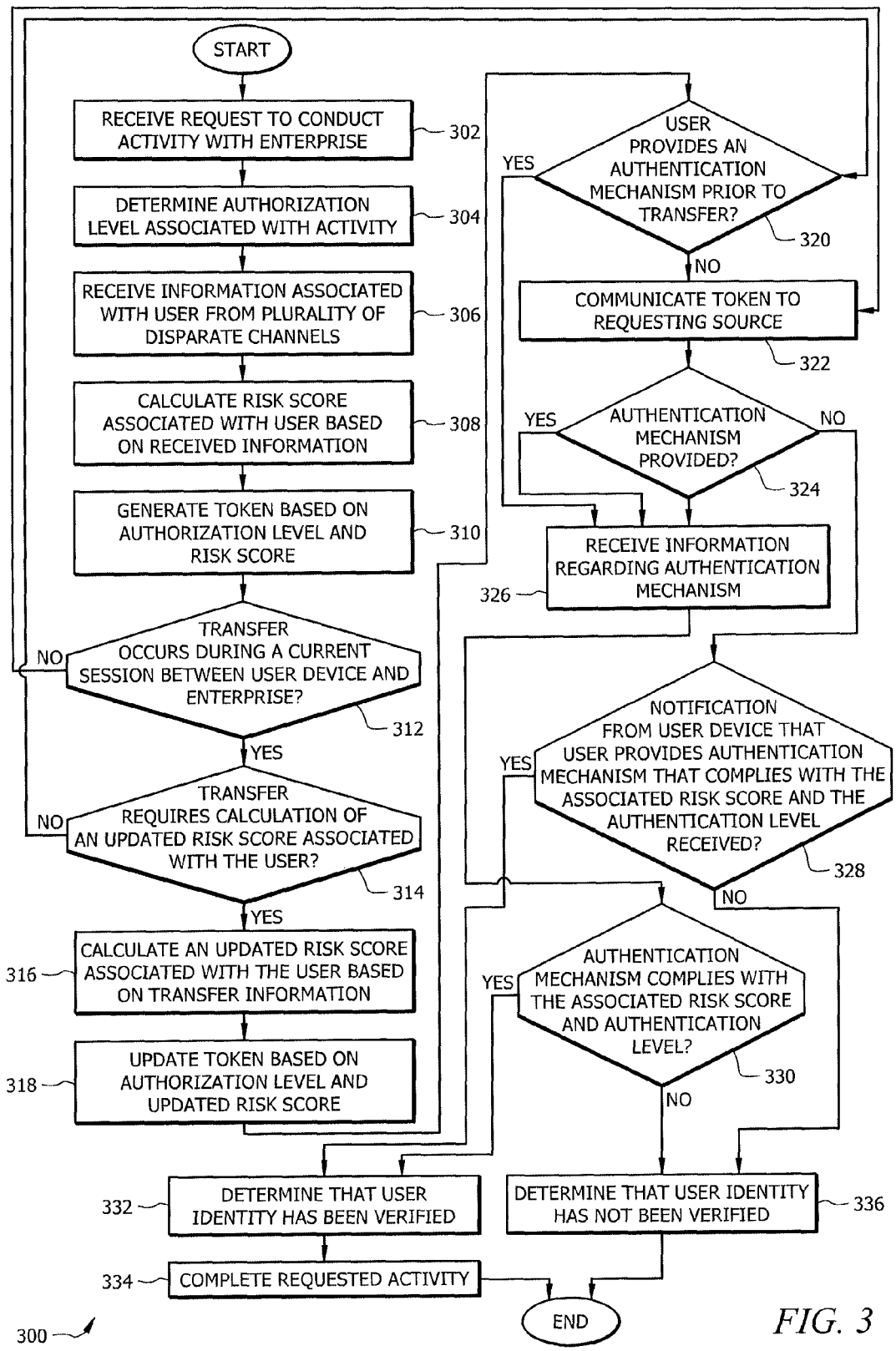
FIG. 3 illustrates an example flowchart for facilitating verification of the identity of a user.

Embodiments of the present invention and its advantages are best understood by referring to FIGS. 1 through 3 of the drawings, like numerals being used for like and corresponding parts of the various drawings.

Banks, business enterprises, and other financial institutions that conduct transactions with customers may perform due diligence to verify the identity of a user. Examples of such transactions include, but are not limited to, requesting a balance inquiry, depositing funds, withdrawing funds, transferring funds, changing an address, and changing a PIN. Typically, the information gathered to verify the identity of a user may be limited to one channel of contact with the user. Normally, the information is gathered through the same channel that the user accesses to request a transaction. The teachings of the disclosure recognize that it would be desirable to receive and aggregate information about a user and user behavior from multiple disparate channels to verify the identity of a user before performing the requested transaction.

FIG. 1 illustrates a system 100 according to certain embodiments that facilitates verification of the identity of a user. System 100 may include an enterprise 110, one or more user devices 115, one or more third-party data sources 130, one or more Knowledge Based Verification Module (KBVM) servers 140, and one or more users 115. Enterprise 110, user devices 115, and third-party data sources 130 may be communicatively coupled by a network 120. Enterprise 110 is generally operable to facilitate business transactions as described below.

In general, one or more KBVM servers 140 may aggregate information and may generate tokens 166 to verify the identity of user 135. User 135 may first provide a request to perform an activity with enterprise 110. User 135 provides a request to KBVM server 140 utilizing user device 115. KBVM server 140 may then receive information from a plurality of channels, including channel modules 125 within enterprise 110 and third-party data sources 130. In some embodiments, KBVM server 140 may calculate a risk score associated with user 135 based on the received information and determine an authentication level associated with the activity requested by user 135. KBVM server 140 may generate a token 166 based on the authentication level and the risk score. KBVM server 140 may then communicate token 166 to the requesting user device 115.

User device 115 may refer to any device that facilitates user 135 conducting a transaction with enterprise 110. In some embodiments, user device 115 may include a computer, workstation, telephone, Internet browser, electronic notebook, Personal Digital Assistant (PDA), pager, or any other suitable device (wireless, wireline, or otherwise), component, or element capable of receiving, processing, storing, and/or communicating information with other components of system 100. User device 115 may also comprise any suitable user interface such as a display, microphone, keyboard, or any other appropriate terminal equipment usable by user 135. It will be understood that system 100 may comprise any number and combination of user devices 115. User 135 utilizes user device 115 to interact with KBVM server 140 to send a request to conduct an activity with enterprise 110 and to receive a token 166 generated by KBVM server 140, as described below. In some embodiments, user 135 may be a new customer of enterprise 110 attempting to conduct an activity such as opening a banking account or opening a credit card. In some embodiments, user 135 may be an existing customer of enterprise 110 attempting to receive information about a current account, open a new account, or make a change to a current account.

Network 120 may refer to any interconnecting system capable of transmitting audio, video, signals, data, messages, or any combination of the preceding. Network 120 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

One or more third-party data sources 130 may refer to any channel or entity that is not within enterprise 110. For example, a third-party data source 130 may include Lexis/Nexis®, Experian®, Dunn & Bradstreet®, and Early Warning$^{SM}$, and provides information about user 135. Other third-party data sources may provide information regarding device reputation, for example who owns the phone that user 135 utilizes or from which country an online request comes. This third-party data source information may be used to facilitate authenticating user 135 to conduct a transaction with enterprise 110. A third-party data source 130 includes a database 131. Database 131 represents any suitable storage device and may include any information associated with user 135.

Enterprise 110 may refer to a financial institution, such as a bank, and may include one or more servers 140, one or more channel modules 125, one or more enterprise centers 151, one or more enterprise administrators 150, and one or more ATMs 152.

Channel modules 125 represent components that allow user 135 to interact with enterprise in various ways. In an exemplary embodiment, channels may include online banking, mobile banking, interactive voice response (IVR), call centers, banking centers, using a debit or credit card, and ATMs. User 135 may interact with the bank through a self-service channel, which includes an action user 135 may perform without assistance from an enterprise administrator 150. Examples of a self-service channel may include making a purchase with a credit or debit card, using online banking to manage funds, using mobile banking to manage funds, and depositing or withdrawing money from an ATM 152. User 135 may also interact with the bank through an associate-assisted channel, in which user 135 receives assistance in performing an activity from enterprise administrator 150. Examples of an associate-assisted channel include talking with enterprise administrator 150 in an enterprise center 151, calling enterprise administrator 150 at a bank center or call center, and participating in an online chat with enterprise administrator 150 through the enterprise website. Channel modules 125 include one or more databases 126 to store information about the past usage behavior of user 135 through the specific channel.

KBVM server 140 may refer to any suitable combination of hardware and/or software implemented in one or more modules to process data and provide the described functions and operations. In some embodiments, the functions and operations described herein may be performed by a pool of KBVM servers 140. In some embodiments, KBVM server 140 may include, for example, a mainframe, server, host computer, workstation, web server, file server, a personal computer such as a laptop, or any other suitable device operable to process data. In some embodiments, KBVM server 140 may execute any suitable operating system such as IBM's zSeries/Operating System (z/OS), MS-DOS, PC-DOS, MAC-OS, WINDOWS, UNIX, OpenVMS, or any other appropriate operating systems, including future operating systems.

In general, KBVM server 140 receives information associated with user 135 and determines whether user 135 has sufficiently verified the identity of user 135 such that enterprise 110 may perform the requested activity with a low risk level of a fraudulent transaction. In some embodiments, KBVM servers 140 may include a processor 155, server memory 160, and an interface 165.

Server memory 160 may refer to any suitable device capable of storing and facilitating retrieval of data and/or instructions. Examples of server memory 160 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or or any other volatile or non-volatile, non-transitory computer-readable memory devices that store one or more files, lists, tables, or other arrangements of information. Although FIG. 1 illustrates server memory 160 as internal to KBVM server 140, it should be understood that server memory 160 may be internal or external to KBVM server 140, depending on particular implementations. Also, server memory 160 may be separate from or integral to other memory devices to achieve any suitable arrangement of memory devices for use in system 100.

Server memory 160 is generally operable to store logic 162, rules 164, and tokens 166. Logic 162 generally refers to algorithms, code, tables, and/or other suitable instructions for performing the described functions and operations. Rules 164 generally refer to policies or directions for determining an authentication level associated with an activity and for calculating a risk score associated with user 135 based on the received information associated with user 135. Rules 164 may be predetermined or predefined, but may also be updated or amended based on the needs of enterprise 110. KBVM server 140 generates one or more tokens 166 that include the authentication level associated with the requested activity and the risk score associated with user 135.

In operation, logic 162 and rules 164, upon execution by processor 155, facilitate receiving information associated with user 135 from a plurality of disparate channels and determining an authentication level associated with the activity user 135 requests. In some embodiments, KBVM server 140 determines an authentication level associated with an activity that user 135 has requested. In some embodiments, an authentication level may include categories such as regular inquiry, step-up inquiry, regular maintenance, step-up maintenance, high risk maintenance, regular transfer/bill pay, step up transfer/bill pay, and high risk transfer/bill pay. It will be understood that authentication levels may comprise any number of various categories and are not restricted to those mentioned here. For example, if user 135 requests that enterprise 110 transfer $50, the authentication level for that activity may be regular transfer; however, if user 135 requests that enterprise 110 transfer $50,000, the authentication level for that activity may be step-up transfer or high risk transfer.

Server memory 160 communicatively couples to processor 155. Processor 155 is generally operable to execute logic 162 stored in server memory 160 to generate tokens 166 according to the disclosure. Processor 155 may comprise any suitable combination of hardware and software implemented in one or more modules to execute instructions and manipulate data to perform the described functions for KBVM server 140. In some embodiments, processor 155 may include, for example, one or more computers, one or more central processing units (CPUs), one or more microprocessors, one or more applications, and/or other logic.

In some embodiments, communication interface 165 (I/F) is communicatively coupled to processor 155 and may refer to any suitable device operable to receive input for KBVM server 140, send output from KBVM server 140, perform suitable processing of the input or output or both, communicate to other devices, or any combination of the preceding. Communication interface 165 may include appropriate hardware (e.g. modem, network interface card, etc.) and software, including protocol conversion and data processing capabilities, to communicate through network 120 or other communication system that allows KBVM server 140 to communicate to other devices. Communication interface 165 may include any suitable software operable to access data from various devices such as user devices 115, channel modules 125, and third-party data sources 130. Communication interface 165 may also include any suitable software operable to transmit data to various devices such as user devices 115. Communication interface 165 may include one or more ports, conversion software, or both. In general, communication interface 165 may receive a request from user device 115, information from a plurality of disparate channels 125, and a notification from user device 115 that user 135 provides an authentication mechanism that complies with the associated risk score and the authentication level.

A risk aggregator 168 represents any suitable device operable to determine the risk score and communicate that risk score with KBVM server 140. Risk aggregator 168 is generally operable to calculate a risk score associated with user 135 based on the received information associated with user 135 from a plurality of disparate channels including third-party data sources 130 and channel modules 125. Risk aggregator 168 uses rules 164 and logic 162 to determine a risk score. For example, risk aggregator 168 may receive information from a channel that identity theft occurred in the past on the account of user 135, which according to rules 164 may increase the risk score. Other factors that may contribute to a risk score include user patterns, location patterns, device patterns, velocity checks, device drift or anomalies, session hijacking, fraud history, password lock out, debit or credit card lockout, recent change of address, change of PINs, reissuing credit or debit cards, and known fraud vectors such as malware, proxy or bot-net detection, jail broken or rooted devices. In some embodiments, risk aggregator 168 may provide two or more separate scores: a self-service behavior risk score and an associate-assisted behavior risk score.

Risk aggregator 168 calculates the self-service behavior risk score of user 135 by using information from self-service channels. For example, risk aggregator 168 may calculate a self-service behavior risk score by analyzing known fraud vectors such as blacklisted IP addresses, locations, or devices; malware; proxy or bot-net detection; and jail-broken or rooted devices. Other contributors to the self-service behavior risk score include overnight score contributors such as user pattern, location pattern, device pattern and also include dynamic score contributors such as velocity check, device drift or anomalies, and session hijacking.

Risk aggregator 168 calculates the associate-assisted behavior risk score by using information from associate-assisted channels. In calculating an associate-assisted behavior risk score, risk aggregator 168 may analyze any fraud history, changes in contact history such as a change of address, change of PIN, or re-issue of a credit or debit card. These examples of factors that risk aggregator 168 may include in its calculation are meant to be illustrative and not limiting.

It will be understood that risk aggregator 168 may determine any number of separate or channel-specific risk scores and may further combine these separate risk scores to determine one aggregated risk score. Although FIG. 1 illustrates risk aggregator 168 as external to KBVM server 140, it should be understood that risk aggregator 168 may be internal or external to KBVM server 140, depending on particular implementations. Also, server memory 160 may be separate from or integral to other memory devices to achieve any suitable arrangement of memory devices for use in system 100.

In some embodiments, KBVM server 140 determines an authentication mechanism based on the risk score and authentication level. The authentication mechanism represents the information presented by user 135 to verify the user's identity. Examples of an authentication mechanism may include an online password, in-house customer or transactional data such as information from the user's last bill, a PIN, an access ID, a verbal password, a typed password, device identification, or biometrics such as a finger print or voice print.

In some embodiments, KBVM server 140 generates a token 166, which comprises information regarding the authentication mechanism, and then communicates that token to user 135. User 135 may then be instructed to provide the authentication mechanism before enterprise 110 conducts the requested activity. User 135 may be instructed to provide a certain authentication mechanism or user 135 may be instructed to provide a combination of different authentication mechanisms. In some embodiments, once user 135 provides the authentication mechanism, interface 165 may receive notification from user device 115 that user 135 provides an authentication mechanism that complies with the associated risk score and authentication level. In some embodiments, KBVM server 140 receives the authentication mechanism and determines whether it complies with the associated risk score and authentication level. In some embodiments, user 135 may not be instructed to provide an additional authentication mechanism. For example, user 135 utilizing user device 115 may provide a password to begin a transaction with enterprise 110. If KBVM server 140 or risk aggregator 168 determines that the authentication mechanism associated with the risk score and authentication level is a password, which user 135 has already provided, then user 135 will not be instructed to provide any additional authentication mechanism.

In an exemplary embodiment of operation, user 135 utilizes user device 115 to send a request to conduct a business transaction over network 120 to enterprise 110. KBVM server 140 receives the request and gathers information from third-party data sources 130 and one or more enterprise channels 125. KBVM server 140 then uses logic 162 and rules 164, and risk aggregator 168 to calculate a risk score, authentication level, and authentication mechanism associated with the user and requested business transaction. KBVM server 140 generates a token 166 comprising information regarding the risk score, authentication level, and authentication mechanism. KBVM server 140 then communicates token 166 over network 120 to user device 115. User 135 provides the authentication mechanism through its user device 115 over network 120 to enterprise 110. KBVM sever uses logic 162 and rules 164 to determine whether user 135 provided an authentication mechanism that complies with the associated risk score and authentication level.

A component of system 100 may include an interface, logic, memory, and/or other suitable element. An interface receives input, sends output, processes the input and/or output and/or performs other suitable operations. An interface may comprise hardware and/or software. Logic performs the operation of the component, for example, logic executes instructions to generate output from input. Logic may include hardware, software, and/or other logic. Logic may be encoded in one or more tangible media, such as a computer-readable medium or any other suitable tangible medium, and may perform operations when executed by a computer. Certain logic, such as a processor, may manage the operation of a component. Examples of a processor include one or more computers, one or more microprocessors, one or more applications, and/or other logic.

Modifications, additions, or omissions may be made to the systems described herein without departing from the scope of the invention. For example, system 100 may include any number of users 135, user devices 115, networks 120, third-party data sources 130, and enterprises 110. As another example, particular functions, such as determining an authentication mechanism associated with the risk score and authentication level, may be performed by a separate component and KBVM server 140 receives the information regarding an authentication mechanism. The components may be integrated or separated. Moreover, the operations may be performed by more, fewer, or other components. Additionally, the operations may be performed using any suitable logic comprising software, hardware, and/or other logic. As used in this document, "each" refers to each member of a set or each member of a subset of a set.

FIG. 2 illustrates an example of a KBVM server 140 for facilitating verification of the identity of a user. KBVM server 140 comprises a risk score calculator 202, an authentication level determiner 204, one or more tokens 166, and an authentication mechanism determiner 206. Once KBVM server 140 receives a request from user device 115 to conduct an activity, authentication level determiner 204 uses the information about the request to determine the authentication level associated with the activity. KBVM server 140 also receives information about user 135 from a plurality of disparate channels, which risk score calculator 202 uses to determine a risk score for user 135 according to the disclosure. KBVM server 140 generates one or more tokens 166, which comprise information regarding the risk score and the authentication level.

Authentication level determiner 204 analyzes a requested business activity and determines a particular authentication level associated with the activity. In some embodiments, an authentication level may include categories such as regular inquiry, step-up inquiry, regular maintenance, step-up maintenance, high risk maintenance, regular transfer/bill pay, step up transfer/bill pay, and high risk transfer/bill pay. For example, if user 135 requests that enterprise 110 transfer $50, the authentication level for that activity may be regular transfer; however, if user 135 requests that enterprise 110 transfer $50,000, the authentication level for that activity may be step-up transfer or high risk transfer. Authentication level determiner 204 may include predetermined or predefined authentication levels associated with business transactions, but the authentication levels may also be updated or amended based on the needs of enterprise 110.

In some embodiments, KBVM server 140 comprises an authentication mechanism determiner 206. Authentication mechanism determiner 206 uses the risk score and the authentication level to determine one or more authentication mechanisms. Examples of an authentication mechanism may include an online password, in-house customer or transactional data such as information from the user's last bill, a PIN, an access ID, a verbal password, a typed password, device identification, or biometrics such as a finger print or voice print.

These authentication mechanisms represent information user 135 can present that would verify the identity of user 135. Authentication mechanism determiner 206 balances the risk score and authentication level to determine what, if any, authentication mechanism would verify the identity of user 135. In certain embodiments, authentication mechanism determiner 206 may determine that the risk score, the authentication level, or a combination of the two is too high for a user to request the particular activity through the specific channel. In some embodiments, authentication mechanism determiner 206 may determine multiple authentication mechanisms that comply with the associated risk score and authentication level. If multiple authentication mechanisms comply with the associated risk score and authentication level, KBVM server 140 may generate one token 166 that comprises information regarding multiple authentication mechanisms or may generate multiple tokens 166 that each comprises information regarding one authentication mechanism.

Modifications, additions, or omissions may be made to the systems described herein without departing from the scope of the invention. For example, risk score calculator 202, authentication level determiner 204, and authentication mechanism determiner 206 may be internal or external to KBVM server 140, depending on particular implementations. The components may be integrated or separated. Moreover, the operations may be performed by more, fewer, or other components. Additionally, the operations may be performed using any suitable logic comprising software, hardware, and/or other logic. As used in this document, "each" refers to each member of a set or each member of a subset of a set.

FIG. 3 illustrates an example flowchart for facilitating verification of the identity of user 135. The method begins at step 302 by receiving a request from a requesting source for user 135 to conduct an activity with the enterprise. In some embodiments, the request may be initiated by a user through an enterprise application on the user's phone. Examples of transactions include transferring funds, depositing a check, checking a balance, and changing a password.

At step 304, KBVM server 140 determines an authentication level associated with the activity. As an example, if user 135 requests to deposit a check for $50 through the user's phone application, the authentication level may be a regular deposit. As another example, if user 135 requests to deposit a check for $50,000 through the user's phone application, the authentication level may be a step-up deposit or a high risk deposit.

KBVM server 140 then receives information associated with user 135 from a plurality of disparate channels in step 306. In some embodiments, KBVM server 140 may receive information from enterprise channels regarding the user's past interactions with the enterprise. For example, a user may utilize the online banking center of the enterprise to change an address and to change the PIN associated with the user's debit card. If user 135 then contacts a call center to request that the bank issue a new debit card, then the call center will receive all the information regarding user 135 changing the address and PIN. In some embodiments, KBVM server 140 may also receive information from third-party channels. For example, if a user would like to open a credit card with the enterprise, then the enterprise may receive information from Experian® regarding the user's credit report and credit score.

In step 308, KBVM server 140 calculates a risk score associated with user 135 based on the received information. Using the example above with a user contacting a call center to receive a new debit card, the risk score may be increased because of the user's recent activity regarding the user's debit card through the online banking center channel. The factors that influence the risk score may be constantly updated depending on the preferences of the enterprise. In step 310, KBVM server 140 generates a token based on the authorization level and risk score. For example, KBVM server 140 may predetermine that for a risk score of 100 and a step-up maintenance authentication level, KBVM server 140 should generate a specific token. KBVM server 140 generates tokens based on any number of combinations of risk score, authentication level, and authentication mechanism.

The system may also determine whether a transfer occurs during a current session between user device and enterprise in step 312. If a transfer does not occur, KBVM server 140 communicates the token to the requesting source in step 322. If a transfer occurs, then step 314 determines whether the transfer requires KBVM server 140 to calculate an updated risk score associated with user 135. For example, a user may call the general help line for the enterprise and an enterprise administrator may transfer the call to a more specific department. In some embodiments, the transfer may involve a switch between unique user devices 115. For example, a user may interact with the enterprise through the online banking center and then use the "click-to-call" function, which automatically puts user 135 in a queue for an enterprise administrator to call user 135. If step 314 determines that KBVM server 140 must calculate an updated risk score, then in step 316, KBVM server 140 calculates an updated risk score associated with user 135 based on transfer information. For example, a user may utilize the "click-to-call" function from a mobile browser, but when the enterprise places the call, it is received by a different device than was used to perform the "click-to-call" request. This information regarding the transfer may alter the risk score and the KBVM server 140 updates the risk score. KBVM server 140 then updates the token in step 318.

In step 320, KBVM server 140 may determine whether user 135 provides an authentication mechanism prior to the transfer. For example, when logging on to the enterprise application on the phone, KBVM server 140 would determine whether user 135 provided a username and password, a fingerprint, a voiceprint, or another authentication mechanism. If the user provides an authentication mechanism prior to transfer, KBVM server 140 receives the information regarding the authentication mechanism in step 326 so user 135 may not need to resubmit the same information. If KBVM server 140 determines that a user has not provided an authentication mechanism prior to transfer, then KBVM server 140 communicates the token to the user in step 322. In some embodiments, the token may provide information to the requesting source regarding the authentication level. For example, it may inform user 135 that the authentication level for depositing a $50,000 check is higher than permitted and thus user 135 may not deposit the check through the particular channel. In some embodiments, the token may provide information to user 135 regarding what authentication mechanism must be provided before allowing user 135 to perform the transaction. For example, the user's phone may display a message indicating that user 135 must provide the PIN associated with the user's account.

In step 324, the system determines whether the user provides one or more authentication mechanisms. If the user did not provide an authentication mechanism, the system determines whether it received notification from the user device that the user provides an authentication mechanism that complies with the associated risk score and the authentication level in step 328. If notification was received, then the system in step 332 determines that the user identity has been verified and then completes the requested activity in step 334 and the method ends. If notification was not received, then the system determines that the user's identity has not been verified in step 335 and the method ends.

If the system determines in step 324 that the user provides an authentication mechanism, then in step 326, information about the authentication mechanism may be received. For example, the user 135 may provide a username and password as an authentication mechanism.

In step 330, it is determined whether the authentication mechanism complies with the associated risk score and authentication level. For example, if user 135 provides a username and password before the transfer and a low risk score is associated with the activity, when user 135 wants to deposit a $50 check, the system may determine that authentication mechanism complies with the risk score and authentication level to deposit the check. As another example, if user 135 provides a username and password before the transfer, but wants to deposit a $50,000 check and a high risk score is associated with the activity, the username and password may not constitute an authentication mechanism that complies with the risk score and authentication level. Another authentication mechanism, such as a fingerprint, may verify the identity such that user 135 may complete the activity having the high risk score and high authentication level.

If the system determines in step 330 that the authentication mechanism does not comply with the associated risk score and authentication level, in step 336 the system determines that the identity of the user has not been verified and the method ends. If the system determines in step 330 that authentication mechanism complies with the associated risk score and authentication level, in step 332 the system determines that the identity of the user has been verified and the activity may be completed at step 334 and the method ends.

Modifications, additions, or omissions may be made to the methods described herein without departing from the scope of the invention. For example, the steps may be combined, modified, or deleted where appropriate, and additional steps may be added. Additionally, the steps may be performed in any suitable order without departing from the scope of the present disclosure. While discussed as KBVM server 140 performing the steps, any suitable component of system 100 may perform one or more steps of the method. For example, user device 115 may receive information regarding authentication mechanism and determine whether the authentication mechanism complies with the associated risk score and authentication level. User device 115 may then notify KBVM server 140 that the user provides an authentication mechanism that complies with the associated risk score and authentication level.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for verifying an identity of a user, comprising:
   receiving a request from a user device for a user to conduct an activity with an enterprise;
   determining, by a processor, an authentication level associated with the activity;
   determining, by a processor, a first channel from which the interface received the request from the user device to conduct the activity with the enterprise;
   receiving information associated with the user from a self-service channel, the self-service channel being a channel operated by the user;
   receiving information associated with the user from an associate-assisted channel, the associate-assisted channel being a channel operated by an associate of the enterprise;
   associating, by the processor, a first risk with the user based on the information associated with the user received from the self-service channel;
   associating, by the processor, a second risk with the user based on the information associated with the user received from the associate-assisted channel;
   determining, by the processor, an authentication mechanism based on the first risk, second risk, and the authentication level, the authentication mechanism being information provided by the user that verifies the identity of the user;
   generating, by the processor a token based on the authentication mechanism, authentication level, the first risk, and the second risk; and
   communicating the token to the user device, the token instructing the user to provide the authentication mechanism that complies with the first risk, second risk, and the authentication level.

2. The method of claim 1, wherein the user is a selected one of an existing customer of the enterprise, a new customer of the enterprise, and a potential customer of the enterprise.

3. The method of claim 1, further comprising receiving information associated with a selected one of a current activity of the user with the enterprise and a previous activity of the user with the enterprise.

4. The method of claim 1, further comprising:
   receiving information from third-party data sources; and
   associating, by the processor, a third risk with the user based at least in part on the information received from third-party data sources.

5. The method of claim 1, further comprising receiving a notification from the user device that the user provides an authentication mechanism that complies with the first risk, the second risk and the authentication level.

6. The method of claim 1, further comprising:
   receiving the authentication mechanism from the user device;
   determining, by the processor, whether the received authentication mechanism complies with the first risk, the second risk and the authentication level.

7. The method of claim 1, further comprising:
   determining, by the processor, whether a transfer occurs during a current session between the user device and the enterprise;
   determining, by the processor, whether the user provides the authentication mechanism prior to the transfer;
   determining, by the processor, whether the transfer requires an update to the first risk;
   in response to determining that the transfer requires an update to the first risk, updating, by the processor, the first risk and updating, by the processor, the token based on the first risk and the authentication level;
   determining, by the processor, whether the transfer requires an update to the second risk; and
   in response to determining that the transfer requires an update to the second risk, updating, by the processor, the second risk and updating, by the processor, the token based on the second risk and the authentication level.

8. A system for verifying an identity of a user, comprising:
   an interface operable to receive a request from a user device to conduct an activity with an enterprise; and
   one or more processors communicatively coupled to the interface and operable to:
     determine an authentication level associated with the activity;
     determine a first channel from which the interface received the request from the user device to conduct the activity with the enterprise;
     receive information associated with the user from a self-service channel, the self-service channel being a channel operated by the user;
     receive information associated with the user from an associate-assisted channel, the associate-assisted channel being a channel operated by an associate of the enterprise;
     associate a first risk with the user based on the information associated with the user received from the self-service channel;
     associate a second risk with the user based on the information associated with the user received from the associate-assisted channel;
     determine an authentication mechanism based on the first risk, second risk, and the authentication level, the authentication mechanism being information provided by the user that verifies the identity of the user;
     generate a token based on the authentication mechanism, authentication level, the first risk, and the second risk; and
   the interface further operable to communicate the token to the user device, the token instructing the user to provide the authentication mechanism that complies with the first risk, second risk, and the authentication level.

9. The system of claim 8, wherein the user is a selected one of an existing customer of the enterprise, a new customer of the enterprise, and a potential customer of the enterprise.

10. The system of claim 8, wherein the interface is further operable to receive information associated with a selected one of a current activity of the user with the enterprise and a previous activity of the user with the enterprise.

11. The system of claim 8, wherein the interface is further operable to receive information from third-party data sources; and
   the one or more processors are further operable to associate a third risk with the user based at least in part on the information received from third-party data sources.

12. The system of claim 8, the interface further operable to receive a notification from the user device that the user provides an authentication mechanism that complies with the first risk, the second risk and the authentication level.

13. The system of claim 8, the one or more processors further operable to:
receive the authentication mechanism from the user device;
determine whether the received authentication mechanism complies with the first risk, the second risk and the authentication level.

14. The system of claim 8, the one or more processors further operable to:
determine whether a transfer occurs during a current session between the user device and the enterprise;
determine whether the user provides the authentication mechanism prior to the transfer;
determine whether the transfer requires an update to the first risk;
in response to determining that the transfer requires an update to the first risk, update the first risk and update the token based on the first risk and the authentication level;
determine whether the transfer requires an update to the second risk; and
in response to determining that the transfer requires an update to the second risk, update the second risk and update the token based on the second risk and the authentication level.

15. A non-transitory computer readable storage medium comprising logic, the logic, when executed by a processor, operable to:
receive a request from a user device for a user to conduct an activity with an enterprise;
determine an authentication level associated with the activity;
determine a first channel from which the interface received the request from the user device to conduct the activity with the enterprise;
receive information associated with the user from a self-service channel, the self-service channel being a channel operated by the user;
receive information associated with the user from an associate-assisted channel, the associate-assisted channel being a channel operated by an associate of the enterprise;
associate a first risk with the user based on the information associated with the user received from the self-service channel;
associate a second risk with the user based on the information associated with the user received from the associate-assisted channel;
determine an authentication mechanism based on the first risk, second risk, and the authentication level, the authentication mechanism being information provided by the user that verifies the identity of the user;
generate a token based on the authentication mechanism, authentication level, the first risk, and the second risk; and
communicate the token in response to the user device, the token instructing the user to provide the authentication mechanism that complies with the total risk score and the authentication level.

16. The computer readable storage medium of claim 15, wherein the user is a selected one of an existing customer of the enterprise, a new customer of the enterprise, and a potential customer of the enterprise.

17. The computer readable storage medium of claim 15, wherein the logic is further operable to receive information associated with a selected one of a current activity of the user with the enterprise and a previous activity of the user with the enterprise.

18. The computer readable storage medium of claim 15, wherein the logic is further operable to:
receive information from third-party data sources; and
associate a third risk with the user based at least in part on the information received from third-party data sources.

19. The computer readable storage medium of claim 15, the logic further operable to receive a notification from the user device that the user provides an authentication mechanism that complies with first risk, the second risk and the authentication level.

20. The computer readable storage medium of claim 15, the logic further operable to:
receive the authentication mechanism from the user device;
determine whether the received authentication mechanism complies with the first risk, the second risk and the authentication level.

21. The computer readable storage medium of claim 15, the logic further operable to:
determine whether a transfer occurs during a current session between the user device and the enterprise;
determine whether the user provides the authentication mechanism prior to the transfer;
determine whether the transfer requires an update to the first risk;
in response to determining that the transfer requires an update to the first risk, update the first risk and update the token based on the first risk and the authentication level;
determine whether the transfer requires an update to the second risk; and
in response to determining that the transfer requires an update to the second risk, update the second risk and update the token based on the second risk and the authentication level.

* * * * *